(12) United States Patent
Uhllg et al.

(10) Patent No.: US 8,402,715 B2
(45) Date of Patent: Mar. 26, 2013

(54) BUILDING PANEL IN PARTICULAR FOR WALL COVERING AND METHOD FOR THE PRODUCTION THEREOF

(75) Inventors: Christoph Uhllg, Berlin (DE); Monika Bauer, Senzig (DE)

(73) Assignee: Fraunhofer-Gesellschaft zur Forderung der Angewandten Forschung E.V., Munich (DE)

(*) Notice: Subject to any disclaimer, the term of this patent is extended or adjusted under 35 U.S.C. 154(b) by 903 days.

(21) Appl. No.: 11/722,656

(22) PCT Filed: Dec. 21, 2005

(86) PCT No.: PCT/EP2005/013800
§ 371 (c)(1),
(2), (4) Date: Jul. 6, 2007

(87) PCT Pub. No.: WO2006/069707
PCT Pub. Date: Jul. 6, 2006

(65) Prior Publication Data
US 2007/0251170 A1    Nov. 1, 2007

(30) Foreign Application Priority Data
Dec. 23, 2004    (DE) .......................... 10 2004 062 264

(51) Int. Cl.
*E04C 1/00*    (2006.01)
*E04C 2/32*    (2006.01)
(52) U.S. Cl. .................................... 52/783.11; 52/309.1
(58) Field of Classification Search ............... 52/783.11, 52/783.14, 783.15, 789.1, 793.1, 309.1; 428/178, 428/188, 166; 264/319, 320, 286; 156/290, 156/293, 297; 29/897, 897.3, 897.32, 525, 29/525.14, 458, 527.1
See application file for complete search history.

(56) References Cited

U.S. PATENT DOCUMENTS 3,108,924 A * 10/1963 Adie .............................. 428/158
(Continued)

FOREIGN PATENT DOCUMENTS

| DE | 19721370 A1 | 11/1998 |
|----|-------------|---------|
| DE | 10022742 A1 | 6/2001  |
| DE | 10135255 A1 | 2/2003  |
| EP | 0158234 A2  | 10/1985 |

(Continued)

OTHER PUBLICATIONS

International Search Report for PCT/EP2005/013800.

*Primary Examiner* — Khoi Tran
*Assistant Examiner* — Jason Holloway
(74) *Attorney, Agent, or Firm* — Caesar, Rivise, Bernstein, Cohen & Pokotilow, Ltd.

(57) ABSTRACT

A structural member (100), particularly for lightweight construction, is described, comprising a two-dimensional extent, and a plurality of adjacent arranged hollow shaped elements (11, 11A) extending across the two-dimensional extent of the structural member, wherein the hollow shaped elements (11, 11A) each have a continuous peripheral side wall (12) and the adjacent hollow shaped elements are connected to each other at their side walls, and wherein two structural spacing parts (15,16), which extend in parallel to the two-dimensional extent of the structural member and form arrangements of the hollow shaped elements (11, 11A), wherein each of the structural spacing parts (15, 16) has a base layer (13, 14) on which the hollow shaped elements (11, 11A) belonging to this structural spacing part (15, 16) are arranged at mutual intervals, and the structural spacing parts (15, 16) are arranged in opposite orientation so that the hollow shaped elements (11, 11A) of the first structural spacing part (15) protrude into the spaces between the hollow shaped elements (11, 11A) of the other structural spacing part (15). Furthermore, a method of manufacturing the structural member is described.

21 Claims, 4 Drawing Sheets

U.S. PATENT DOCUMENTS

| | | | | |
|---|---|---|---|---|
| 3,842,768 A | * | 10/1974 | Maistre | 114/312 |
| 3,865,679 A | * | 2/1975 | Hale | 428/105 |
| 3,899,805 A | * | 8/1975 | McMillan | 24/584.1 |
| 4,134,243 A | * | 1/1979 | Fries | 52/596 |
| 4,495,237 A | * | 1/1985 | Patterson | 428/178 |
| 4,631,221 A | * | 12/1986 | Disselbeck et al. | 428/166 |
| 4,923,544 A | * | 5/1990 | Weisse | 156/153 |
| 5,030,501 A | * | 7/1991 | Colvin et al. | 428/178 |
| 5,032,208 A | | 7/1991 | Strauss | |
| 5,158,821 A | | 10/1992 | Gebauer et al. | |
| 5,266,379 A | * | 11/1993 | Schaeffer et al. | 428/178 |
| 5,364,686 A | | 11/1994 | Disselbeck et al. | |
| 5,390,467 A | * | 2/1995 | Shuert | 52/783.14 |
| 5,401,347 A | * | 3/1995 | Shuert | 156/245 |
| 5,444,959 A | * | 8/1995 | Tesch | 52/794.1 |
| 5,447,776 A | | 9/1995 | Disselbeck | |
| 5,470,641 A | * | 11/1995 | Shuert | 428/178 |
| 5,599,606 A | * | 2/1997 | Disselbeck et al. | 428/156 |
| 5,670,278 A | | 9/1997 | Disselbeck et al. | |
| 5,683,782 A | | 11/1997 | Duchene | |
| 5,716,693 A | * | 2/1998 | Pittman | 428/178 |
| 5,894,045 A | * | 4/1999 | Desrondiers | 428/178 |
| 5,993,724 A | * | 11/1999 | Shuert | 264/545 |
| 6,018,927 A | * | 2/2000 | Major | 52/793.1 |
| 6,074,509 A | * | 6/2000 | Pittman | 156/213 |
| 6,131,005 A | * | 10/2000 | Ozawa | 399/107 |
| 6,713,008 B1 | * | 3/2004 | Teeter | 264/258 |
| 7,010,897 B1 | * | 3/2006 | Kuppers | 52/793.1 |
| 7,021,017 B2 | * | 4/2006 | Herron | 52/516 |
| 7,416,775 B2 | * | 8/2008 | Snel | 428/178 |
| 7,591,114 B2 | * | 9/2009 | Herron, III | 52/516 |

FOREIGN PATENT DOCUMENTS

| | | |
|---|---|---|
| EP | 0250005 A1 | 12/1987 |
| EP | 0409120 A2 | 1/1991 |
| EP | 0411372 A2 | 2/1991 |
| EP | 0436419 A1 | 7/1991 |
| EP | 0512431 A1 | 11/1992 |
| EP | 0725454 A1 | 8/1996 |
| WO | 0032382 A1 | 6/2000 |
| WO | 0058080 A1 | 10/2000 |
| WO | 02099218 A1 | 12/2002 |

* cited by examiner

BUILDING PANEL IN PARTICULAR FOR WALL COVERING AND METHOD FOR THE PRODUCTION THEREOF

BACKGROUND OF THE INVENTION

The invention relates to a structural member, particularly for paneling or construction purposes. The invention also relates to a method for producing such a structural member and its use. The invention also relates to a tool for producing the structural member.

The use of layered components (sandwich components), for example as paneling or structural elements, is known in lightweight construction. A layered component, e.g. for self-supporting bodies, consists of a stack structure with two cover layers between which a core material (a core layer) is located. These layers are designed so that the weight of the component is as low as possible, yet has as high a load-bearing capacity as possible. A material with a high modulus of elasticity, e.g. fiber-reinforced plastic, is therefore selected for the cover layers, whilst a less rigid but as light as possible a material is used for the core layer. Hitherto, the core layer has frequently been made of foam or honeycomb materials in practice. Conventional honeycomb materials typically consist of cells, the side walls of which forming the characteristic comb with a hexagonal basis area (honeycomb).

Due to their low rigidity, relatively high density and high flammability, the foam materials have a series of disadvantages. In contrast, honeycomb materials have a better rigidity-to-weight ratio and lower flammability. Nevertheless, conventional honeycomb materials are subject to restrictions in lightweight construction, due to the following disadvantages.

A first disadvantage is the complicated method for producing the cells of the honeycomb material. For, example, a conventional method consists of first gluing paper plies by means of paper webs, then drawing them apart and finally soaking them with a phenol resin and allowing it to cure. Slices cut from these paper honeycombs can then be used as core layers in lightweight construction. All the phases of this method must be carried out with great precision, to produce uniform and stable core layers. This requires complicated, expensive precision machinery. In other conventional techniques (see e.g. WO 00/58080 and WO 00/32382), the cells are formed by the deformation of so-called folded combs. These methods are also disadvantageous, due to the high demands for precision and the associated high production costs.

A further disadvantage of conventional honeycomb materials is the anisotropy of the rigidity characteristics. As the cells are formed by gluing folded paper strips together, each cell has walls consisting of a double layer of paper in certain directions and walls with a single layer of paper in other directions, so that the rigidity of the honeycomb material is differently influenced in the various directions.

Finally, conventional honeycomb materials present the disadvantage of restricted freedom of design in adaptation for a specific use. For example, a honeycomb core layer cannot be stiffened locally at certain points without further measures. Stiffening has hitherto only been achieved with core filling materials, which, however, entail weight problems. In addition, curved sandwich structures which use the honeycomb as a core material can only be produced either by cutting the honeycomb used to the curves required or by adapting it to the curve by applying force in the form of pressure (the "crushed core" method), which destroys the honeycomb.

Planar structures, which are formed by deep-drawing a plastic material and distinguished by a base layer with tapered stump-shaped elevations (see e.g. DE 197 21 370, EP 411 372, EP 512 431) represent an alternative to honeycomb materials. The use of such planar structures has been proposed for lightweight construction (EP 158 234, EP 250 005), automotive construction (EP 409 120) and also for other functional elements (EP 725 454). However, these planar structures have the disadvantage of relatively low compressive rigidity, so that lightweight structural members which are made using them have a pronounced tendency to deformation.

Lightweight structural members are known from U.S. Pat. No. 5,683,782 and U.S. Pat. No. 5,032,208, in which the core layers are formed by a plurality of cylindrical tubular sections, the outer sides of which are interconnected. The production process of these lightweight structural members, in which the core layers are cut from stacks of tubes glued together by their outer sides, and the restricted versatility in adapting lightweight structural members to a specific task, are particularly disadvantageous.

The objective of the invention is to provide an improved structural member, particularly for lightweight construction, which can overcome the disadvantages of conventional core layer materials and which is characterized by high rigidity. It should also be possible to produce the structural member with simple resources and it should have a high degree of freedom of design in adaptation to the respective application. The objective of the invention is also to provide an improved method of producing a structural member for lightweight construction.

These objectives are solved by a structural member and a method with the features of the invention. Advantageous embodiments and applications of the invention are defined below.

SUMMARY OF THE INVENTION

In terms of a device, the invention is based upon the general technical teaching of providing a structural member which is assembled from two structural spacing parts with a plurality of hollow shaped elements, which are arranged so that they are in contact with each other alongside and at their outer side walls, the structural member being mainly planar in shape. A hollow shaped element is a structure with an inner hollow space, surrounded by a side wall. The side wall of each hollow shaped element has a continuous periphery, i.e. the side wall consists of a single material in one piece, so that it is formed continuously along a peripheral line around the hollow space. The hollow shaped elements are preferably formed in the shape of a cup or alternatively sphere on a base layer.

In accordance with an essential feature of the invention, two structural spacing parts are provided which extend in parallel to the dimension of the component and form arrangements of the hollow shaped elements. Each structural spacing part has a base layer from which the hollow shaped elements belonging to the respective structural spacing parts protrude in one piece. The hollow shaped elements are arranged at mutual distances, the dimensions of which allow the insertion of hollow shaped elements of the other structural spacing part. The structural spacing parts are arranged opposite each other so that the hollow shaped elements of one structural spacing part protrude into the spaces between the hollow shaped elements of the other structural spacing part. In accordance with another essential feature of the invention, provision is made for the outsides of the adjacent hollow shaped elements to touch. The outsides are preferably connected with each other along contact areas or lines. A three-dimensional, quasi-isotropic compound system of cells, which can absorb tensile, shear or compressive forces in all directions in space, is advantageously formed by connecting the side walls, as in the lattice of a solid body.

The hollow shaped elements adjacent to each other comprise in particular the nearest neighbors, which are located on all sides of a hollow shaped element under consideration, in accordance with the planar dimension of the structural member. The number of adjacent (next) profiled elements depends upon the packing (areal) density of the hollow shaped elements and amounts to, for example, four in a square grid or six in a hexagonal grid. In the case of other geometries, three or also more than four nearest neighbors may be present.

The structural member in accordance with the invention has a specific flat elongation. This means that the structural member extends principally in two dimensions along a flat or curved reference surface with a thickness in accordance with the space formed by the height of the hollow shaped elements. The reference surface for describing the flat elongation of the structural member may be curved, for example in the following cases. Firstly, curvature may emerge under practical conditions of use, e.g. as the core layer in a lightweight structural member. Secondly, the structural spacing parts may have locally differing forms, so that the dense packing with the connected side walls produces an overall curved form. Finally, the structural member may have deformation areas with reduced rigidity.

The structural member according to the invention has the following advantages. Firstly, the compressive rigidity of structural members according to the invention, particularly as the core layer in a lightweight structural member, is considerably increased, by comparison with the compressive rigidity of the conventional planar structure (e.g. in accordance with DE 197 21 370) described above. The inventors have found that the slight deformability of the conventional planar structure is caused by the fact that individual tapered stump-shaped elevations at intervals from each other may be deformed relatively easily under the effect of external forces, as the side walls of these elevations may bend or bulge easily. In contrast, the side walls of the hollow shaped elements in the inventive structural member, which are in contact with and connected to each other, are exposed to significantly increased effect of force by pressure or transverse force. The side walls of the hollow shaped elements are strengthened by the compound structure of adjacent hollow shaped elements. An individual side wall of a hollow shaped element can no longer be kinked inwards, for example, without the side wall of the adjacent hollow shaped element being kinked outwards. Mutual strengthening of the hollow shaped elements is achieved because the hollow shaped elements usually have differing rigidities resisting kinking inwards or outwards. Strength is also increased because each individual side wall is connected to all the other side walls, all the side walls being strengthened by this three-dimensional compound structure.

A further advantage of the structural members according to the invention is that the above-mentioned anisotropy of conventional honeycomb materials is overcome, particularly in the arrangement of the hollow shaped elements on a regular area grid.

The structural member according to the invention may advantageously form a core layer for a lightweight building panel which achieves the rigidity of honeycomb material with comparable dimensions (size of the hollow spaces in the hollow shaped elements or the cells in honeycomb material, and density). At the same time, however, the structural member according to the invention can be produced by considerably simpler means, e.g. from a plurality of individual hollow shaped elements or the combination of complementary structural spacing parts which contain the hollow shaped elements in the form of elevations.

The geometrical design of the hollow shaped elements and their arrangement may be selected on the basis of the following aspects. The hollow shaped elements are arranged regularly in two directions in space and each have a peripheral side wall, a cover surface (face) and a base area. The face and the base area of the hollow shaped elements are aligned in parallel with each other and preferably have the same shape, i.e. they have self-similarity, i.e. they are either identical in size and shape or have the same shape, but differ from each other by a scaling factor. The scaling factor between the base area and the face is less than or equal to 1, i.e. the face is either the same size or smaller than the base area. The geometrical shape of the base area and the face are selected so that each has at least twofold symmetry. Symmetries greater than twofold and also axially symmetrical base areas and faces (circles) are also possible.

Moreover, the hollow shaped elements are characterized by a symmetry axis which passes through the centers of the cover surface and base area and which is perpendicular to both surfaces. Thus, in accordance with the shape of the face and base areas, the hollow shaped elements have an axial symmetry in relation to this symmetry axis, which symmetry may be twofold (e.g. if the cover surface and base area are rectangular), threefold (e.g. if the cover surface and base area are triangular), fourfold or greater (e.g. sixfold, if the base area is hexagonal). The cover surface and base area may therefore be, for example, circles, ellipses, equilateral or isosceles triangles, rectangles or squares.

In accordance with a preferred version of providing a cup form, the hollow shaped elements are further characterized by the base area being open, i.e. the hollow shaped element (planar element) consists solely of the peripheral side wall and the cover surface.

Such three-dimensional hollow shaped elements are held in position relative to each other by the base layer (base area), with the symmetry axes of the individual hollow shaped elements in parallel to each other and perpendicular to a preferably plane base layer. The base layer extends in a plane with the open base areas, i.e. the base area is connected to the lower edge of the peripheral side walls of the hollow shaped elements. Thus, the base layer used for positioning and the hollow shaped elements connected to it form a continuous, three-dimensional planar structure: the structural spacing part. This three-dimensional planar structure is characterized by a periodic arrangement of hollow shaped elements in two directions in space lying in the plane of the base layer.

The periodic arrangement of the hollow shaped elements in two directions in space on a square grid may, for example, be described with the grid constant A, the diameter of the cover surface $d_1$, the diameter of the base area $d_2$ (where $d_1 \leq d_2$) and the diagonal of the grid D where $D = d_1 + d_2$ and $D = A/\sqrt{2}$. Alternatively, geometry may be implemented in which $D > A/\sqrt{2}$. This means that a mismatch between the size of the hollow shaped elements of one structural spacing part and the spaces between the hollow shaped elements of the other structural spacing part is formed, making it possible to increase pressure on the side walls and compensating better for tolerances.

Advantages also emerge from the great freedom of design in selecting the type of connection formed between the hollow shaped elements. If the hollow shaped elements are connected with each other to fit positively, advantages for the production of the structural member may emerge as the connection between the side walls is even produced by the arrangement of the hollow shaped elements in the compound structure of the structural member. A cramping or anchoring with projections on the surfaces of the side walls, such as Velcro or velvet connection, for example, forms a positively-fitting connection. If the side surfaces to be connected are pressed against each other on assembly by suitable devices or by the deformation behavior of the side walls and a positively-fitting connection is formed between the hollow shaped elements, advantages to additional strength of the hollow shaped elements and thus increased rigidity may emerge. With a force-fitted connection, the side wall material of the hollow shaped elements is exposed to physical stress, the effect of which is to increase strength. Generation of the pressure forcing the side walls together takes place, for example, in an assembly process, e.g. gluing. Reciprocal locking may, for example, be selected as a force-fitting connection. Ultimately, if a firmly-bonded connection between the side walls in contact with each other is formed, advantages may emerge for a particularly strong side cross-linking of the hollow shaped elements and thus also for increased strength of the structural member. The firmly-bonded connection includes, for example, gluing with adhesive or a thermal connection, e.g. welding or soldering. Firmly-bonded connections may have the additional advantages of an increased contact surface between adjacent hollow shaped elements. According to the invention, the above types of connection may be implemented singly or in combination.

High variability advantageously exists in the selection of the material of the structural spacing parts having the hollow shaped elements. In accordance with preferred embodiments of the invention, their side walls may consist of fibrous material, particularly textile or holohedral fibrous materials, or of foils. Fibrous materials may possess advantages for the production and compounding of the hollow shaped elements and for the strength of the structural member. If the side walls of the hollow shaped element each consist of a peripheral foil, advantages for the mutual connection of the hollow shaped element emerge. The use of hollow shaped elements which are made of paper, non-woven fabric, deep-drawn knitted fabrics or hosiery, plastic foils, particularly thermoplastic or duroplastic films and/or metallic or ceramic films is particularly preferred.

In accordance with further variants of the invention, the side walls of the hollow shaped elements have at least one of the following modifications, by means of which improved fixation or strengthening of the side walls may be achieved advantageously. Firstly, side walls may be impregnated or coated with a binder. The binder may consist of, for example, a curable resin. Secondly, the side walls may have a substructure, for example unevenness, which improves the rigidity of the side walls and also promotes mutual stabilization of the interconnected hollow shaped elements adjacent to the side walls.

The base layers of the structural spacing parts provided in accordance with the invention preferably consist of the same material as the side wall of the respective structural spacing parts. The base layers extend mainly perpendicularly to the elongation in height of the hollow shaped elements. The base layers also have advantages in the movement and alignment of the hollow shaped elements for their compounding in the structural member according to the invention or in the connection of the structural member to cover layers, e.g. for production of a lightweight building panel.

The inventive structural member with the hollow shaped elements connected at the side by the base layers can be produced simply, by inserting hollow shaped elements of a suitable size into the gaps between the elevations formed by the hollow shaped elements in a structural spacing part. Particular advantages for the production of the structural member according to the invention emerge if the structural member is assembled from two complementary structural spacing parts each of which comprising hollow shaped elements with intervals relative to each other. The gaps between the hollow shaped elements forming the elevations in the first structural spacing part are precisely adapted to the size of the hollow shaped elements which form the elevations of the second structural spacing part, and vice versa.

Further simplifications and enhanced isotropy of the rigidity of the structural member emerge if both structural spacing parts have the same shape and the gaps between the hollow shaped elements are precisely configured to receive a hollow shaped element of the other structural spacing part.

The physical strength of the inventive construction component is advantageously increased if the cover layers of the hollow shaped elements of one structural spacing part come into contact with the base layer in the gaps between the hollow shaped element of the other structural spacing part. Physical contact exists not only between the side walls of adjacent hollow shaped elements, but also between the cover surface and base area. The cover surface and base area are preferably connected to each other across a flat surface. The connection particularly resembles the connection between the side walls.

In a particularly preferred embodiment, the hollow shaped elements do not have a constant cross-sectional surface area but a taper along the elongation of their height. The side walls of the hollow shaped elements are at an angle to the planar elongation of the structural member. The orientation of the hollow shaped elements is determined by the taper of the hollow shaped elements from their root to the opposite end (hereinafter referred to as the face end). To create a closed, preferably flat shape of the structural member, two hollow shaped elements connected at their side walls have a respective opposite orientation. The compound structure of hollow shaped elements with side walls inclining at opposite angles has the particular advantage that additional forces can be absorbed by the inclination of the side walls under pressure or transverse force loads. The inventors have found that the compression strength of the inventive structural member with hollow shaped elements glued at the side is increased by three to five times compared to conventional planar structures of a similar size with stump-shaped elevations at intervals from each other. This achieves an outstanding rigidity to weight ratio to be achieved.

A further advantage in the freedom of design of the structural member according to the invention is that the side walls of the hollow shaped element may be evenly or alternatively concavely curved. Even side walls have the advantage that planar contact surfaces are formed between adjacent hollow shaped elements, making a particularly firm connection possible. In contrast, curved side surfaces have the advantage that the accuracy requirements which must be made on mutual alignment of the hollow shaped elements in contact with each other are less strict in order to form a linear or strip form contact zone that is sufficient for a firm connection.

In accordance with an advantageous variant of the invention, the hollow shaped elements may be formed so that they initially only come into contact with each other in lines or at isolated points on their side walls when the structural spacing parts are in their assembled state. After pressure has been applied to achieve a mutual connection between the structural spacing parts, the hollow shaped elements may be deformed, to form planar contact areas which provide the connection between the adjacent hollow shaped elements. The physical strength of the inventive structural member is thus advantageously increased. It is particularly preferable for the side walls of the cup-shaped or spherical hollow shaped elements to be formed from simple geometrical figures, e.g. in the case of plane side surfaces, as prisms, with a triangular, rectangular or polygonal base, preferably regular, particularly cuboid or pyramid, particularly with a rectangular or hexagonal base or as a corresponding frustum of a pyramid, or, in the case of curved side walls, as a cylinder, particularly a circular cylinder or a cylinder with an elliptical base, cone, particularly a circular cone or cone with an elliptical base, or corresponding frustum of a cone, or spheres, hemispheres, hemispherical segments, semi-ellipsoids or semi-ellipsoidal segments. In the structural member according to the invention in its assembled state, the hollow shaped elements may have deformations due to reciprocal local pressure against each other (reciprocal local displacement) of adjacent hollow shaped elements.

The provision of concavely-curved side walls has the advantage that the pressure of the side walls against each other can be increased in a positive connection. This effect may be further enhanced if the faces of the hollow shaped elements also have concave curvature.

In accordance with preferred embodiments of the invention, the hollow shaped elements in the structural member are arranged on at least the side of one of the structural spacing parts as a rectangular, particularly square, grid, a hexagonal grid or a linear grid. This advantageously achieves high isotropy of the rigidity of the structural members and a high packing density of the hollow shaped elements.

In general, the inventive compound structure of hollow shaped elements attached to each other at the side can be used as an independent structural member, particularly in lightweight construction, e.g. as covering, to attenuate vibration, particularly as soundproofing, or as protection against impacts. However, the creation of a layered (sandwich) structure in which the structural member has a cover layer on at least one side is preferred. Increased flexural strength and compressive rigidity can be advantageously achieved by the cover layer. The outer layer also affords greater protection against fire. In accordance with a particularly preferred version of the invention, two cover layers are provided, between which the structural member is located as a core layer.

The at least one cover layer particularly preferably consists of a compound material, e.g. fiber-reinforced duroplast or thermoplast, or alternatively of metal, e.g. aluminum, steel, titanium, magnesium or a plastic, e.g. polypropylene or polyethylene, preferably with a high degree of crystallization or high-performance (high Tg) thermoplast such as PEEK, to achieve a high modulus of elasticity.

Additional advantageous embodiments of the invention are characterized by a local variation in the rigidity of the structural member, achieved by at least one of the following measures.

Firstly, straight hollow shaped elements with a constant cross-sectional area may be combined with tapering hollow shaped elements. In sub-areas preferably intended to absorb compressive forces, hollow shaped elements with straight sidewalls, which are aligned perpendicularly to the elongation of the structural member, are used, whilst angled side walls of hollow shaped elements are provided in areas in which transverse force forces are preferably to be absorbed.

Secondly, a local variation in rigidity may be achieved by the creation of at least one deformation area, in which the size, materials or shapes of the hollow shaped elements are selected to achieve reduced rigidity or in which hollow shaped elements at intervals from each other are located instead of hollow shaped elements connected to each other. For example, hollow shaped elements with a reduced areal density may be arranged, to achieve deformability.

In one area, one of the two complementary structural spacing parts may be waived to vary the rigidity, so that only the hollow shaped elements of one structural spacing part are provided (simple arrangement) in this area of reduced rigidity, whilst the two complimentarily (and conjoined) structural spacing parts (double arrangement) produce considerably greater rigidity in adjacent areas. This may be used, for example, to produce curved sandwich components, in which the curvature can be adjusted simply by the use of partial simple arrangement.

Thirdly, the structural member may have at least one filling region, in which at least one hollow shaped element, but preferably several hollow shaped elements, is filled with a core filling mass. The filling region advantageously facilitates local solidification, e.g. for the attachment of further construction elements (e.g. screws). The core filling mass preferably consists of ceramics or organic materials, e.g. plastics. One or more core filling masses can be introduced advantageously from both sides of the inventive structural member. A particular advantage of the invention in relation to the production of the structural member is that the hollow shaped elements can be filled with the core filling mass before the complementary structural spacing parts are assembled.

In accordance with a further preferred embodiment of the invention, the structural spacing parts are arranged relative to each other so that they are offset. A plurality of hollow shaped elements of one part of one of the structural spacing parts protrudes over one edge of the other structural spacing part. At least one further structural spacing part is connected to the protruding part by placing the complementary hollow shaped elements together. Extended core material components can thus be produced advantageously from complementary structural spacing parts (nub pieces) which are smaller than the entire structural member. For this purpose, the structural spacing parts are not placed directly one above the other, but are arranged offset from each other. An upper structural spacing part bridges at least two structural spacing parts. If this compounding principle is extended in two directions in space, nine, for example, lower structural spacing parts can be connected to four upper structural spacing parts, so that every four upper elements connect four lower elements each.

In terms of the method, the above objective is solved by producing the structural member according to the invention with the following steps. First, the structural spacing parts with the hollow shaped elements are arranged so that the side walls of adjacent hollow shaped elements are in contact with each other on the outside. This arrangement is achieved by putting together the above-mentioned complementary structural spacing parts. The side walls in contact with each other are then connected in accordance with one of the above types of connection. The method according to the invention represents a considerable simplification of the conventional method of forming honeycomb materials. It also offers great versatility in configuring the mechanical properties of the structural members even during their production by means of dimensioning, the selection of material and arrangement of the hollow shaped elements used.

The hollow shaped elements can be produced advantageously with a known technique, by extrusion, casting, for example injection molding, embossing or deep drawing.

A further advantage of the invention compared to conventional techniques is that simple planar structures with nubs or honeycombs only cure with a thermosetting resin (a resin curing at room temperature would not suffice because it would not provide storage stability), whilst the two structural spacing parts can be impregnated with chemically different substances and only subjected to curing in their assembled state. For example, the upper structural spacing part can be impregnated with a hardener and the lower one with a resin, curing not taking place until both parts are pressed together, both the elements having prior storage stability. Alternatively, both of the structural spacing parts can be coated with an adhesive which is dry at room temperature, in a preparatory step. This simplifies handling of the structural spacing parts when assembling the structural member. The adhesive only softens when heated in the assembled state, so that the connection is made between the adjacent hollow shaped elements and can subsequently cure.

In accordance with a preferred embodiment of the invention, the structural spacing parts are pressed together during connection of the side walls and of the outer and base layers, if applicable. Pressing the structural spacing parts together provides the following advantages, in addition to the improved adhesive bond.

In general, the external compressive force can be exercised by two opposing dies with a size and shape which correspond to the design of the entire structural member. For example, flat or curved dies may be used to produce flat or curved structural members. A variant in which dies are used which essentially have the same profile as the structural spacing parts and which are arranged to complement each other and be operated in the same way as the complementarily fit together structural spacing parts is particularly preferred. In this way, protrusions on the dies can penetrate the hollow shaped elements from within, the complementary structural spacing parts being connected under pressure, e.g. glued and cured. Thus both the cover surfaces of the hollow shaped elements of the one structural spacing part are connected under pressure to the base area (base layer) of the complementary structural spacing part and the side walls of the hollow shaped elements of the one structural spacing part are connected, e.g. glued, under pressure to the side areas of the adjacent hollow shaped elements of the complementary structural spacing part. The hollow shaped elements are advantageously expanded, i.e. deformed, by the die. Thus the previously linear (or possibly only isolated) points of contact between the side walls of the hollow shaped elements of one structural spacing part with the side walls of all the immediately adjacent hollow shaped elements of the complementary structural spacing parts become planar connections of the side walls. Simultaneous planar connections exist with all the immediately adjacent hollow shaped elements of the complementary structural spacing part. A firm planar compound of all the hollow shaped elements is thus made. The compound has a similar structure to the conventional honeycomb, but not necessarily with hexagonal basic elements and with the additional advantage over the honeycomb that the compound may be produced with angled side surfaces, which, for example, can increase the shear strength of the structural member.

A particularly advantageous embodiment is the use of rubber (elastomer) dies, e.g. temperature-resistant silicone rubbers. The non-compressibility of rubber can be exploited in the case of dies with a planar elongation with a large number of projections, enabling a larger number of hollow shaped elements to be pressed together. As the projections are under pressure inside the die with a planar elongation and cannot deviate by shearing or elongation because of two complementary dies pressing into each other, a high bonding pressure is achieved on the surfaces of the complementarily structural spacing parts fit together due to the non-compressibility of the rubber. The projections of the two elastomer dies complimentarily penetrating into each other (and thus the hollow shaped elements of the two structural spacing parts into which they penetrate) can be deformed naturally so that the contact pressure on the surfaces of all the immediately adjacent hollow shaped elements of the complementary structural spacing parts is the same and a symmetrical, highly rigid and firm connection is formed.

In another embodiment, the die may also consist of a rigid material, with the advantage that specific joint geometry can thus be enforced.

A pressure device with two complimentarily shaped dies, penetrating into each other which essentially have the same profile as the structural spacing parts, so that the projections on the die penetrate the hollow shaped elements from within, represents an independent subject of the invention. The dies may have an elongation matching the elongation of the structural member to be specifically produced, or may take the form of two rollers.

The use of the structural member according to the invention as a protective layer, partition component, paneling element or core layer in a lightweight construction element represents a further independent subject of the invention. There are preferred applications in building technology, shipbuilding, and automotive and aerospace construction.

Further details and advantages of the invention are described below, with reference to the relevant drawings, which show in:

DETAILED DESCRIPTION OF PREFERRED EMBODIMENTS

Figure 1:
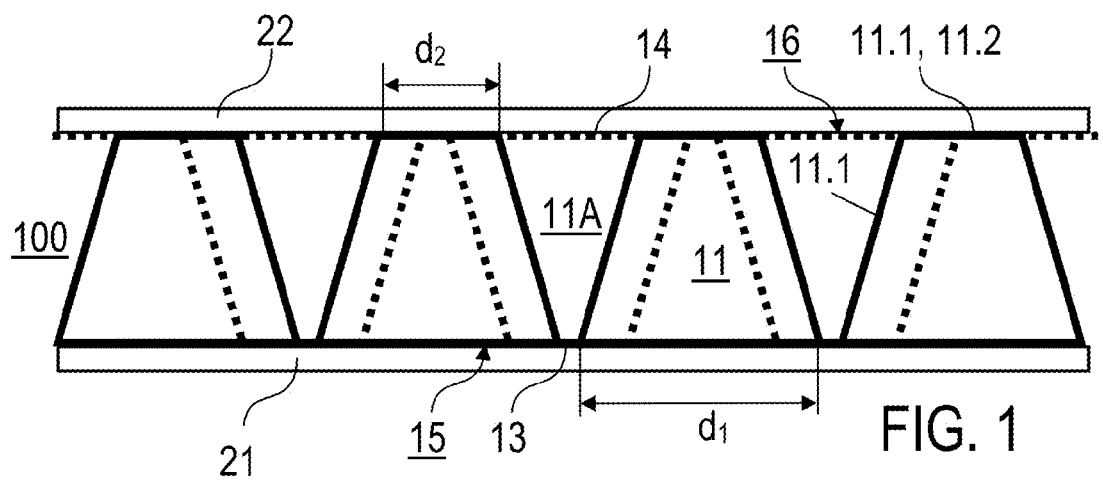
FIGS. 1 to 8: illustrations of the arrangement of hollow shaped elements in different embodiments of structural members according to the invention.

The invention is described below, with exemplary reference to preferred embodiments, which illustrate the geometry of the hollow shaped elements and their mutual arrangement. It is emphasized that the implementation of the invention is not restricted to the examples shown, but that it can be implemented in modified form in accordance with the above examples. In the drawings, the side walls and thus also the outer shape of the hollow shaped elements are shown in schematic form. In particular, the specific dimensions, shapes and materials of the hollow shaped elements, the overall outer shape of the structural members only shown in part below and the types of connection between the hollow shaped elements are selected by a person skilled in the art depending upon the desired application. The external shapes of the hollow shaped elements described by geometrical forms may deviate from the respective ideal geometrical form under practical conditions in the realization of the invention, due to deformation of the materials.

Figure 2:
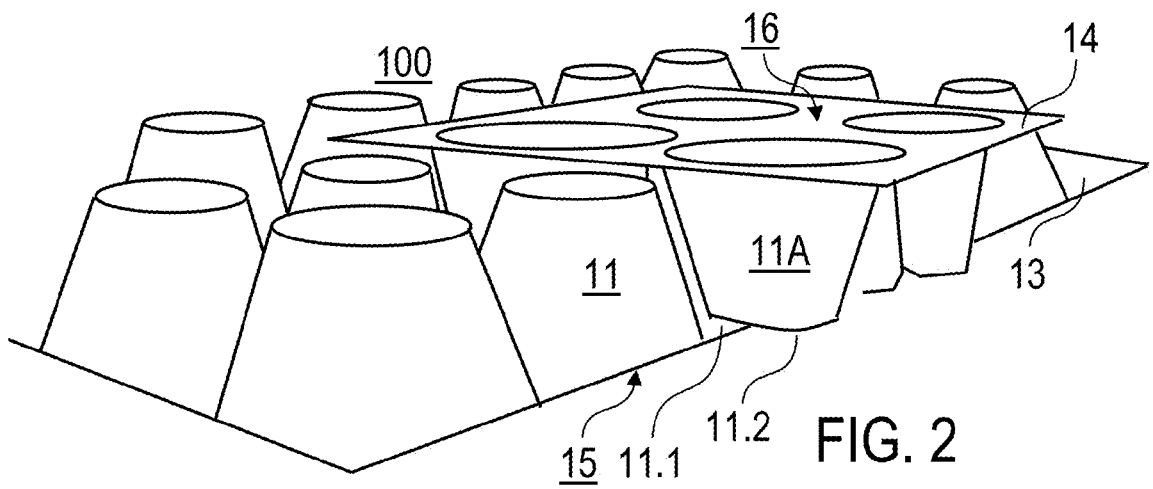
Figure 3:
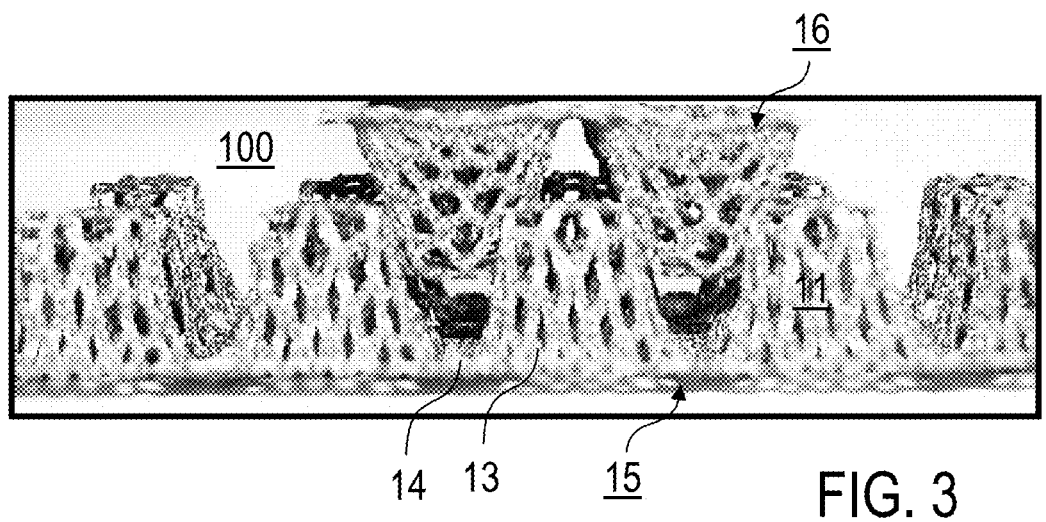

A first embodiment of an inventive structural member 100 with truncated cone-shaped hollow shaped elements 11 is shown in FIGS. 1 to 3. FIG. 1 is a partial side elevation of a structural member 100 with a first structural spacing part 15 (shown by continuous lines) and a second structural spacing part 16 (shown by dotted lines). The structural spacing parts are formed so that they complement each other and arranged so that the hollow shaped elements 11 are inserted together. The structural spacing parts are arranged between cover layers 21, 22 which form the surfaces of the structural member 100. The cover layers 21, 22 are connected to the corresponding base layers 13, 14 of the structural spacing parts 15, 16, e.g. glued. The first structural spacing part 15 has truncated cone-shaped hollow shaped elements 11, the bases of which are connected to the base layer 13 and which form a square grid facing one side of the structural member 100. The bases of the other truncated cone-shaped hollow shaped elements 11A are connected to the structural spacing part 16 by the base layer 14 and arranged on the opposite side of the structural member 100. The base layers 13, 14 have spaces between the roots of the hollow shaped elements 11, 11A, designated base areas here (see e.g. 11.1 in FIG. 2).

Each hollow shaped element 11, 11A comprises a peripheral side wall and a cover surface 11.2. The side walls of adjacent hollow shaped elements 11, 11A are in contact with each other. The cover surfaces 11.2 are in contact with the base area 11.1 of the opposite structural spacing part in the spaces between hollow shaped elements.

The hollow shaped elements 11 have, for example, the following geometrical properties and dimensions:
arrangement of truncated cones in the form of a square grid,
$d1=10.5$ mm, $d2=6.5$ mm,
$D=d1+d2=17$ mm,
height of the truncated cones: 10 mm.

The extent of the surface in parallel to the reference plane 101 or along a possibly curved reference surface (not shown) is selected as a function of the use of the structural member 100 and may have typical dimensions into the square meter range or above. The structural member 100 in accordance with FIG. 1 represents, for example, an impact protection element, a soundproofing layer or a core material in a sandwich component.

FIG. 2 shows the compound system of the structural spacing parts 15, 16 (in extract form) analogously to FIG. 1, without the cover layers, in the form of a schematic perspective view. The structural spacing parts having equal structure are put together in such a way that one hollow shaped element (truncated cone) of one structural spacing part comes into contact with the side surfaces of four hollow shaped elements of the opposite (complementary) structural spacing part respectively. The cover layers of the hollow shaped elements are formed by the truncated cone faces. The truncated cone faces (the free smaller circular surface of the truncated cone) of the one structural spacing part are in contact with the other structural spacing part between four truncated cones. A planar connection is preferably formed between the truncated cone faces and the base area between adjacent hollow shaped elements of the respective opposite (complementary) structural spacing part.

Manufacturing of the structure shown in FIG. 2 comprises, for example, the following steps:

(1) Firstly, a deep-drawable polyester or aramide fiber knitted fabric (or hosiery) is produced using a method which is known per se, and it is soaked with a reactive resin, particularly with a thermosetting reactive resin, e.g. phenol resin. A prepreg method is used, which involves soaking the knitted fabric in a resin solution with subsequent drying (removal of the solvent and/or prepolymerization of the resin), whereby the reactive resin becomes hard or highly viscous after cooling and a sticky or preferably dry pre-product is formed, depending on the properties.

(2) Subsequently, thermal deep drawing of the pre-product with a heated deep-drawing die is realized with a process known per se. Thus, the shape of the structural spacing parts with the protruding hollow shaped elements is formed. When heated, the reactive resin first liquefies. After deep drawing, the reactive resin cools, the geometry of the structural spacing part being fixed after renewed curing.

A textured deep-drawing die or extrusion die is preferably used, which impresses the above-mentioned substructure on the side walls of the hollow shaped elements. To improve separation of the hollow shaped elements from the deep-drawing die, the latter may be treated with a mould removal agent, e.g. on a PTFE basis, so that the resin (the adhesive) does not stick to it.

In accordance with the invention, the molding methods described in DE 197 21 370 may be used as an alternative.

(3) Subsequently, the fixed structural spacing parts are soaked in an adhesive suitable as resin. A thermosetting resin, e.g. phenol resin or thermosetting epoxy resin, is used. Soaking takes place in a solvent bath with subsequent thermal drying to remove the solvent. Following drying and cooling, the resin may be sticky or preferably dry, depending upon the properties. Alternatively, the resin (for soaking) may be sprayed on in a solution or emulsion.

(4) After the two structural spacing parts have been produced separately in steps (1) to (3), assembling of the structural member 100 follows. The state of assembly is shown in FIG. 3 by the photograph of a structural member 100 formed of two interlocking structural spacing parts 15 and 16 (shown in part). The hollow shaped elements 11 of the structural spacing parts 15 have side protrusion at their root, by which all the hollow shaped elements 11 belonging to structural spacing part 15 are connected to the base layer 14 by each other. The complementary structural spacing part 16 is also correspondingly structured.

FIG. 3 shows as an example that the structural spacing parts 15, 16 may be of different sizes and may be arranged offset in relation to each other. Part of the lower structural spacing part 15 protrudes above the edge of the upper structural spacing part 16. A further structural spacing part (not shown) may be inserted in the free partial area.

The stack compound cures, e.g. in a heated press or by "vacuum bagging" after the opposingly-oriented structural spacing parts have been interlocked. The adhesive (the resin) liquefies again at increased temperatures, so that the side surfaces 12 can be glued. Contact with the side surfaces 12 of the oppositely-oriented structural spacing parts 15, 16 is guaranteed by the pressure of the heating press.

Other forms of pressure on the side walls (e.g. for gluing) may be used, e.g. pressing at very high pressures in a pressure device using dies which have the exact shape of the hollow shaped elements, e.g. which are shaped as nubs, or pressure by pins which have the shape of the hollow shaped elements. The latter may also be carried out in a roll-to-roll method, in which two heated rolls interlock correspondingly (complementarily). Pressure may also be accumulated by appropriate vacuum bagging. Further details of the use of a pressure facility are described below, with reference to FIGS. 11 and 12.

Instead of connecting the side walls by gluing with resin, the polyester fibers may be melted on.

Gluing with the cover layers also takes place in the production of a structure in accordance with FIG. 1. The cover plies may be cured in advance or cure as prepregs in step (4). (5) Finally, the structural member is given its final treatment and prepared and shaped for the specific use.

In deviation from the method described, single instead of double soaking with resin may be provided, to fix and glue the structural spacing parts. Resins may be formulated suitably and the time-temperature management of the process be designed so that a lower temperature and/or a longer time may be set for fixing the structural spacing part than for layer gluing of the structural spacing parts (possibly together with the cover layers).

The production of the structural member from other materials, e.g. metallic, ceramic or thermoplastic films, papers, non-woven fabrics, etc, takes place analogously, coating with resin being provided instead of soaking. The hollow shaped elements may be subjected to transverse force or pressure to apply pressure to the side walls in the joining process. The side walls of the hollow shaped elements may have a substructure, e.g. a substructure of the outsides.

The following methods may be used singularly or in combination in the production of a curved structural member. Firstly, the flexibility of the hollow shaped elements may be exploited in the uncured or partly cured state, to curve the assembled structural spacing parts to the desired shape of the structural member. Bonding and curing of the structural member then follow, applying external compressive force with the pressure device. The dies of the pressure device are curved to the desired shape of the structural member. The hollow shaped elements are deformed to a different extent, depending upon local curvature. In accordance with a second possibility, curved dies with projections which interlock with the hollow shaped elements, are used. This advantageously avoids irregular deformation of the hollow shaped elements and guarantees pressure on the side walls or outer layers and base layers of the structural spacing parts complementarily fit together. Thirdly, the structural spacing parts may have hollow shaped elements with size gradients which automatically produce a curved shape of the structural member in the assembled state with side walls which are in contact with each other.

Figure 4:
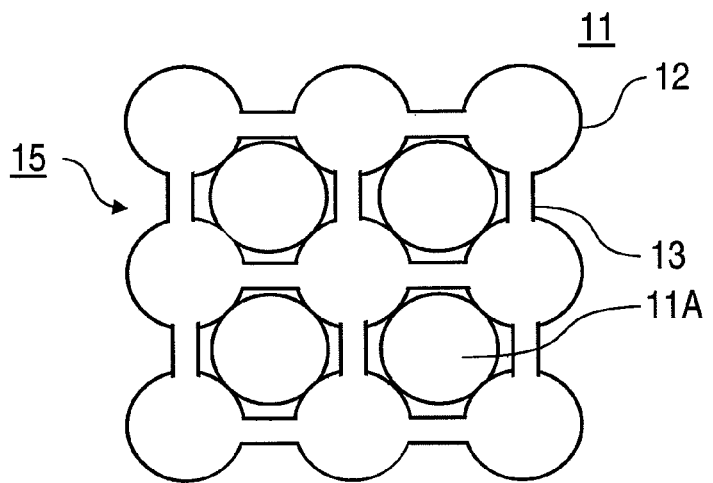

FIG. 4 is a diagrammatic representation of a modified embodiment of the inventive structural member, in which cylindrical hollow shaped elements 11 are provided. In addition, the base layers (e.g. 13) do not form a closed entity, but are interrupted, unlike the embodiment shown in FIG. 1. The hollow shaped elements 11 are connected by webs in the form of strips at their root, so that a lateral compound of the base layer 13 is formed. The hollow shaped elements 11A which do not belong to structural spacing part 15 are located in the gaps between hollow shaped elements 11 of the structural spacing parts 15 and also connected to one or in areas to several structural spacing parts.

In accordance with the invention, provision may be made for the webs of the base layer to be formed by punching out unnecessary areas after the structural spacing part has been molded, so that the entire structure is advantageously lighter.

Figure 5:
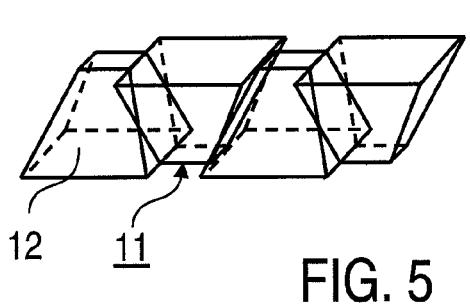
Figure 6:
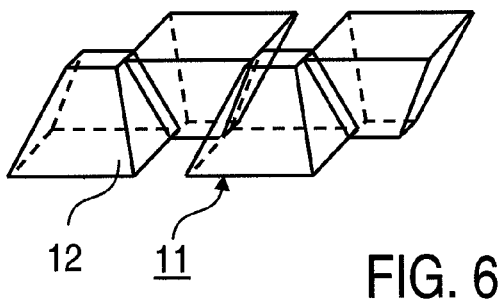

FIGS. 5 and 6 illustrate a sample arrangement of hollow shaped elements 11 in the shape of the frustum of a pyramid (shown without the base layers for the sake of clarity), which are arranged in straight rows with alternate orientations (FIG. 5) or offset (FIG. 6). In this case, the contact zones between the hollow shaped elements are formed by the overlapping areas of the touching pyramid side walls 12.

Figure 7:
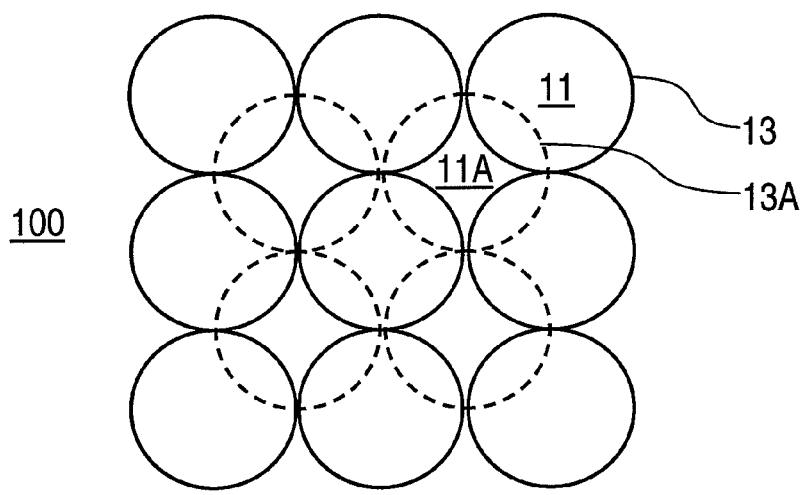
Figure 8:
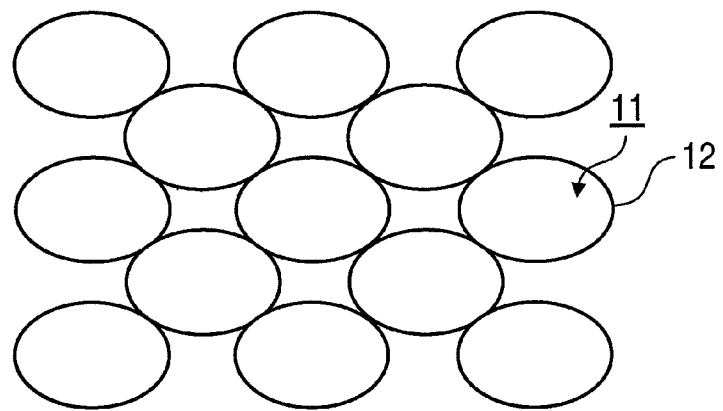

FIGS. 7 and 8 are schematic top views of arrangements of differently-molded hollow shaped elements 11, 11A (without the base layers). The two-dimensional elongation of the structural members extends in parallel to the drawing plane. According to FIG. 7 and analogously to FIGS. 1 and 2, the oppositely oriented tapering hollow shaped elements 11, 11A are offset so that the smaller faces (not shown) fit into the gaps between the larger roots of the respective hollow shaped elements with a reverse orientation. The projections of the hollow shaped elements perpendicular to the elongation of the structural member overlap mutually. If, in contrast, the side walls 12 of the hollow shaped elements 11 form e.g. elliptical cylinders, the version shown in FIG. 8 emerges.

Figure 9:
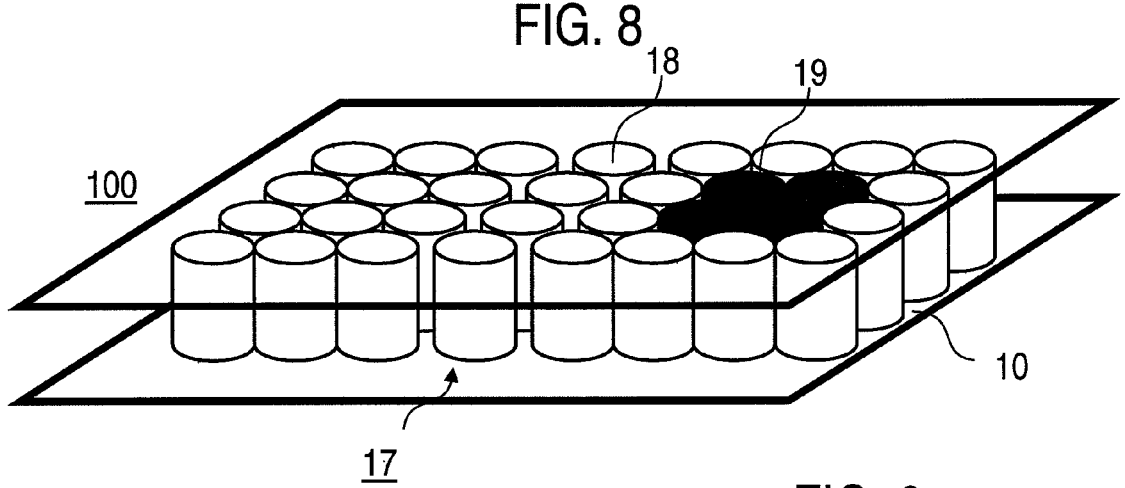
FIG. 9: a schematic illustration of further characteristics of structural members according to the invention.

An example of the advantageous versatility of structural members according to the invention in creating specified deformation properties is shown in FIG. 9. For example, a deformation region 17 may be provided in which reduced rigidity is produced by means of an interruption in the compound with hollow shaped elements 18 at intervals from each other. A filling region 19 is also illustrated, which is produced by filling the hollow shaped elements 11 with a plastic filling material.

A partially-stiffened structural member can be produced by creating deformation regions 17, only partial regions being equipped, according to the invention, with connected hollow shaped elements, whilst other parts of the stack structure have individual standing hollow shaped elements at intervals. This makes, for example, parts of the structural member rigid and dimensionally stable (e.g. the flat parts of a stack structure) and other areas easily bendable for installation or covering purposes.

Figure 10:
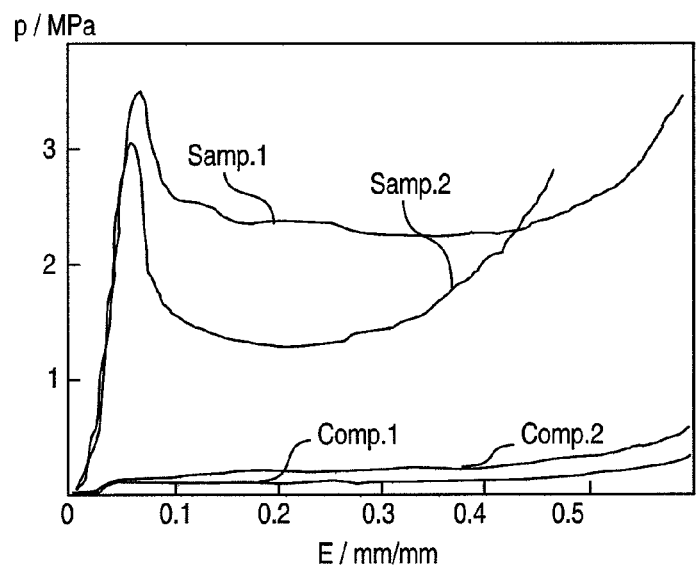
FIG. 10: curves to illustrate the results of load experiments.

The results of load experiments on structural members according to the invention and comparable materials are shown on the stress-strain diagrams in FIG. 10. Embodiments in accordance with FIG. 1 with cover layers were used as structural members according to the invention (Samp. 1, Samp. 2). Stacks of cover layers and a single planar structure (Comp. 1) or cover layers and two planar structures are used for comparison, the side surfaces of which were, however, not connected (Comp. 2). The pressure test of the load experiments was carried out on a test machine between parallel pressure plates.

The stress-strain diagrams illustrate the interdependency of stress and strain and display a drastic change in the stress-strain relationship for the structural members according to the invention. As well as an increase in rigidity, i.e. the slope of the curve at its linear commencement, a pronounced peak of the stress-strain curve was surprisingly detected, which would correspond to a yield point in homogenous solid bodies. This behavior advantageously corresponds to precisely the stress-strain behavior of standard honeycomb-core layer materials. The single-layer Comp. 1 is distinguished by a stress-strain curve which continues to rise slightly after reaching its peak. This feature is, however, not necessary for use of the structural member according to the invention as a core material, as the material is only to be stressed up to a level below the peak anyway in applications such as internal coverings on aircraft or luggage racks. However, it is more important to achieve as high a peak as possible, as shown for the samples Samp. 1 and Samp. 2.

Outstanding absolute measurement results were also found, in addition to the qualitative improvement to the shape of the stress-strain curve. The compression strength of the structural members according to the invention increases by three to five times compared to the structures Comp. 1 and Comp. 2 due to the gluing of the side surfaces. The compression strength in compression mode (principally the compression strength) was increased to two to three times greater. Corresponding improvements were also detected in the determination of the specific values of the weight-related compression strength and modulus of elasticity related to weight.

Figure 11:
FIGS. 11 to 13: illustrations of the use of a pressure device to exercise compressive force when producing structural members according to the invention.
Figure 12:
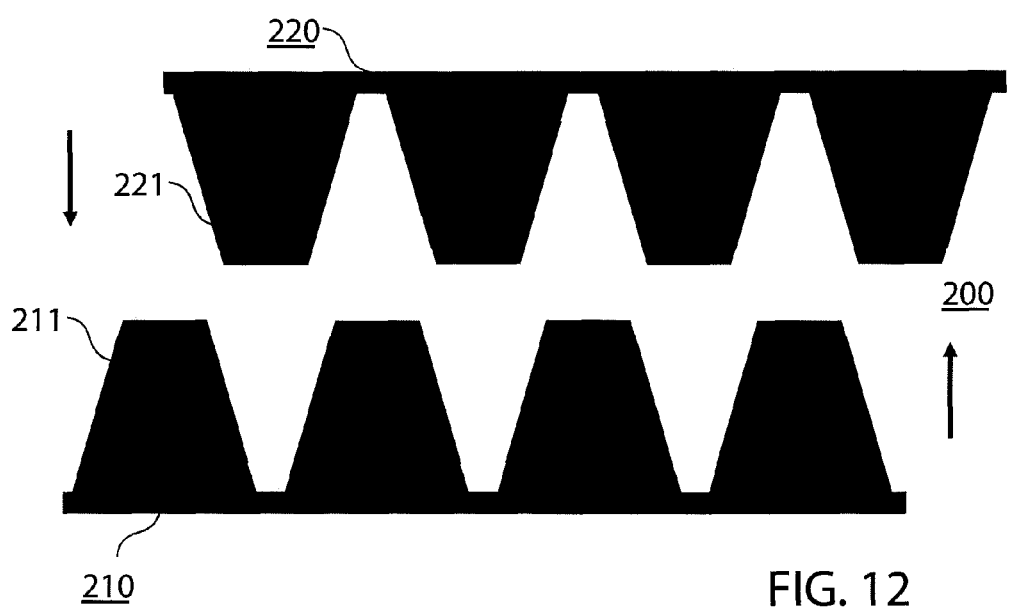
Figure 13:
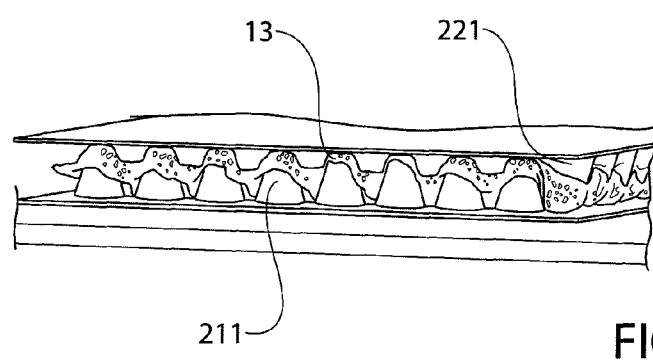

FIGS. 11 to 13 illustrate the inventive use of a pressure device with textured dies for producing the structural member according to the invention. The pressure device 200 comprises two dies 210, 220, each with projections 211, 221. The projections 211, 221 have the shape and arrangement of the hollow shaped elements 11 (e.g. in accordance with FIG. 1 or 3). FIG. 11 shows a detail of a die 210 with a structural spacing part 13 placed on it, the side walls and faces of which are supported by the projections 211 from within. The structural spacing part 13 and the die 210 are shown with an interval, for reasons of clarity. FIG. 12 illustrates the mutual arrangement of the dies 210, 220 (without the structural spacing parts) in the assembly of the structural member according to the invention. The dies arranged so that they are offset to each other are pushed into each other in the direction shown by the arrow until the structural spacing parts are in contact along the side walls and touching the faces and base layers. Then, e.g. gluing follows as described above. FIG. 13 is a photograph of the dies 210 with the projections 211, 221 and the placed on structural spacing parts 13.

In accordance with a first variant, the dies 210, 220 may be made of a rigid, hard material. The shape of the projections 211, 221 corresponds precisely to the shape of the hollow shaped elements. The projections 211, 221 consist, for example, of metal or plastic, e.g. PTFE.

In accordance with a second variant, the dies and projections consist of a soft material, e.g. rubber, particularly silicone rubber. The dies may be advantageously cast in a known method in this case. A perforated plate may be provided, which improves the strength and alignment of projections of the dies.

The use of dies in a soft, deformable material has the advantage that all the hollow spaces which may be present locally are filled and the adjacent hollow shaped elements are pressed together as hard as possible when pressure is exerted on the interlocking structural spacing parts. The hollow shaped elements may be deformed locally, so that planar contact and bonding takes place between the side walls and the face and base layers.

The characteristics of the invention disclosed in the above description, claims and drawings may be significant to implementation of the invention in its various embodiments, both individually and in combination.

The invention claimed is:

1. A structural member for construction, said structural member, comprising:
    (a) a two-dimensional extent, and
    (b) a plurality of adjacent arranged hollow shaped elements extending across the two-dimensional extent of the structural member, said hollow shaped elements being made from a fibrous textile material and being impregnated with a binder made of a thermosetting reactive resin, wherein:
        (i) the hollow shaped elements each have a shape of a truncated cone with a continuous peripheral side wall and a cover surface and the adjacent hollow shaped elements are connected to each other at their side walls,
        (ii) two structural spacing parts extend in parallel to the two-dimensional extent of the structural member and form arrangements of the hollow shaped elements,
        (iii) each of the structural spacing parts has a base layer on which the hollow shaped elements belonging to this structural spacing part are arranged at mutual intervals,
        (iv) the structural spacing parts are arranged in opposite orientation so that the hollow shaped elements of a first structural spacing part protrude into spaces between the hollow shaped elements of a second structural spacing part and each of the hollow shaped elements touching each other with their side walls belongs to another one of the structural spacing parts,
        (v) the interlocking structural spacing parts are formed so that they are complementary relative to each other, wherein the spaces between the hollow shaped elements of the first structural spacing part are adapted to sizes of the hollow shaped elements forming the elevations of the second structural spacing part and vice versa and cover surfaces of the hollow shaped elements of the first structural spacing part touch base areas of the base layer in spaces between the hollow shaped elements of the second structural spacing part and vice versa, and
        (vi) the hollow shaped elements are joined to each other positively by force-fit along the side walls being face to face in contact with each other and by said reactive resin and the hollow shaped elements are deformed by mutual local pressure of adjacent hollow shaped elements.

2. The structural member in accordance with claim 1, wherein the hollow shaped elements are glued, welded, soldered or stapled to each other, anchored by projections or locked at the side walls touching each other.

3. The structural member in accordance with claim 1, wherein the fibrous textile material is at least one material selected from the group consisting of deep-drawn knitted fabrics or hosiery, and non-woven fabrics.

4. The structural member in accordance with claim 1, wherein the interlocking structural spacing parts are formed of hollow shaped elements of the same size and shape and of the spaces between the hollow shaped elements belonging to one of the structural spacing parts, respectively.

5. The structural member in accordance with claim 1, wherein the hollow shaped elements are each tapered by inclined side walls, the tapers of the adjacent hollow shaped elements being mutually connected by their side walls in opposite orientation.

6. The structural member in accordance with claim 1, wherein the hollow shaped elements form a quadrilateral, hexagonal or linear grid.

7. The structural member in accordance with claim 1, further comprising at least one deformation region, in which the hollow shaped elements are arranged at a lower surface density compared to their environment.

8. The structural member in accordance with claim 1, further comprising at least one filling region, in which a core filling mass is located.

9. The structural member in accordance with claim 1, further comprising a cover layer on at least one side along its extent.

10. The structural member in accordance with claim 9, wherein the cover layer is formed from plastic, metal or a composite material.

11. The structural member in accordance with claim 9, further comprising at least one deformation region, in which the hollow shaped elements are located on the cover layer at intervals from each other.

12. The structural member in accordance with claim 1, wherein the two structural spacing parts are arranged so that they are offset relative to each other, so that a part of the first structural spacing part protrudes beyond one edge of the second structural spacing part, wherein at least one further structural spacing part is connected to the protruding part of the second structural spacing part.

13. A method for manufacturing a structural member in accordance with claim 1, comprising the following steps:
- arrangement of the structural spacing parts in opposite orientation to each other, so that the hollow shaped elements of one structural spacing part protrude into the spaces between the hollow shaped elements of the other structural spacing part and vice versa, and the side walls of adjacent hollow shaped elements are in mutual contact, and
- connection of the structural spacing parts in contact with each other.

14. The method in accordance with claim 13, wherein the hollow shaped elements are produced by extrusion or injection molding or by deep-drawing of the structural spacing parts.

15. The method in accordance with claim 14, wherein the arrangement of the hollow shaped elements comprises a putting together of the structural spacing parts.

16. The method in accordance with claim 13, wherein the connection between the structural spacing parts comprises gluing, welding, soldering, stapling, anchoring or locking.

17. The method in accordance with claim 13, wherein the structural spacing parts are pressed together under the effect of compressive force during their connection.

18. The method in accordance with claim 17, wherein the compressive force is exercised by dies which have projections with a shape corresponding to an internal shape of the hollow shaped elements.

19. The method in accordance with claim 13, wherein the structural member is connected to a cover layer on at least one side.

20. A method of using a structural member in accordance with claim 1, comprising at least one of the following steps:
- providing a protective layer, particularly on street furniture or vehicles, to protect pedestrians or occupants,
- providing a partition component,
- providing a paneling element in aerospace construction, and
- providing a core material in a lightweight building panel.

21. The method in accordance with claim 18, wherein the compressive force is exercised by dies which are made of elastomers.

* * * * *

UNITED STATES PATENT AND TRADEMARK OFFICE
CERTIFICATE OF CORRECTION

PATENT NO.          : 8,402,715 B2
APPLICATION NO.     : 11/722656
DATED               : March 26, 2013
INVENTOR(S)         : Uhlig et al.

It is certified that error appears in the above-identified patent and that said Letters Patent is hereby corrected as shown below:

On the Title page, under item (12), "Uhllg et al." should read -- Uhlig et al. --.

On the Title page, under item (75) "Inventors", the inventors name reading "Christoph Uhllg" should read -- Christoph Uhlig --.

Signed and Sealed this
Eleventh Day of June, 2013

Teresa Stanek Rea
*Acting Director of the United States Patent and Trademark Office*